(12) United States Patent
Gary et al.

(10) Patent No.: US 6,963,919 B1
(45) Date of Patent: Nov. 8, 2005

(54) METHOD AND SYSTEM FOR IMPROVING COMPUTER NETWORK PERFORMANCE

(75) Inventors: Robert M. Gary, Folsom, CA (US); Roger Hosier, Shingle Springs, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 892 days.

(21) Appl. No.: 09/797,015

(22) Filed: Feb. 28, 2001

(51) Int. Cl.[7] ............................................. G06F 15/16
(52) U.S. Cl. ...................................... 709/229; 709/207
(58) Field of Search ............................... 709/218, 203, 709/206, 207, 204, 205, 229; 713/168, 170; 370/235, 238; 714/25

(56) References Cited

U.S. PATENT DOCUMENTS

| | | | |
|---|---|---|---|
| 6,018,766 A * | 1/2000 | Samuel et al. ............... | 709/218 |
| 6,275,859 B1 * | 8/2001 | Wesley et al. ............... | 709/229 |
| 6,538,996 B1 * | 3/2003 | West et al. .................... | 714/25 |
| 6,671,724 B1 * | 12/2003 | Pandya et al. ............... | 709/226 |
| 6,748,447 B1 * | 6/2004 | Basani et al. ................ | 709/244 |
| 6,751,218 B1 * | 6/2004 | Hagirahim et al. .......... | 370/390 |

OTHER PUBLICATIONS

U.S. Appl. No. 09/345,634, filed Jun. 30, 1999.
U.S. Appl. No. 09/469,025, filed Dec. 21, 1999.
U.S. Appl. No. 09/469,026, filed Dec. 21, 1999.
U.S. Appl. No. 09/702,160, filed Oct. 30, 2000.
U.S. Appl. No. 09/770,427, filed Jan. 26, 2001.

* cited by examiner

Primary Examiner—Paul H. Kang

(57) ABSTRACT

A system and method for reducing unnecessary alert messages is achieved by allowing a user agent to store alert, and alert update, messages in storage remote from the alert generation system. Typically, these alerts would come from a central source, such as a rule engine. Without local storage of prior alerts, the rule engine would have to generate new alerts for each new user entering the system.

19 Claims, 3 Drawing Sheets

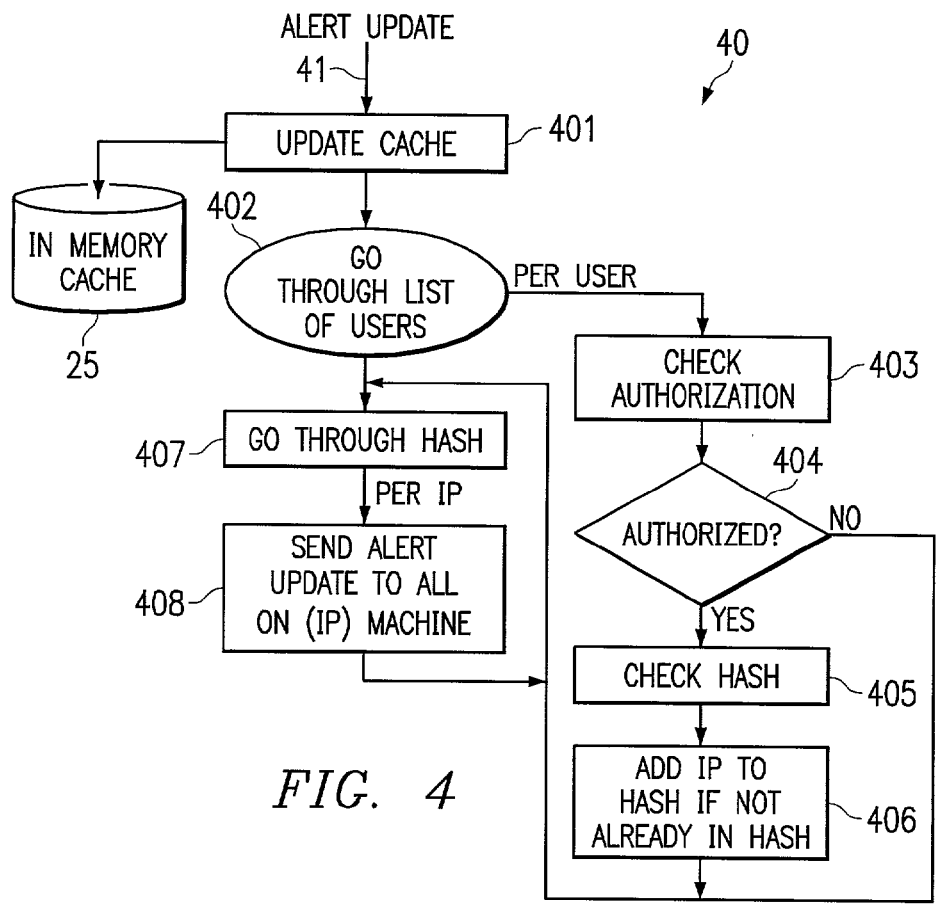
FIG. 4
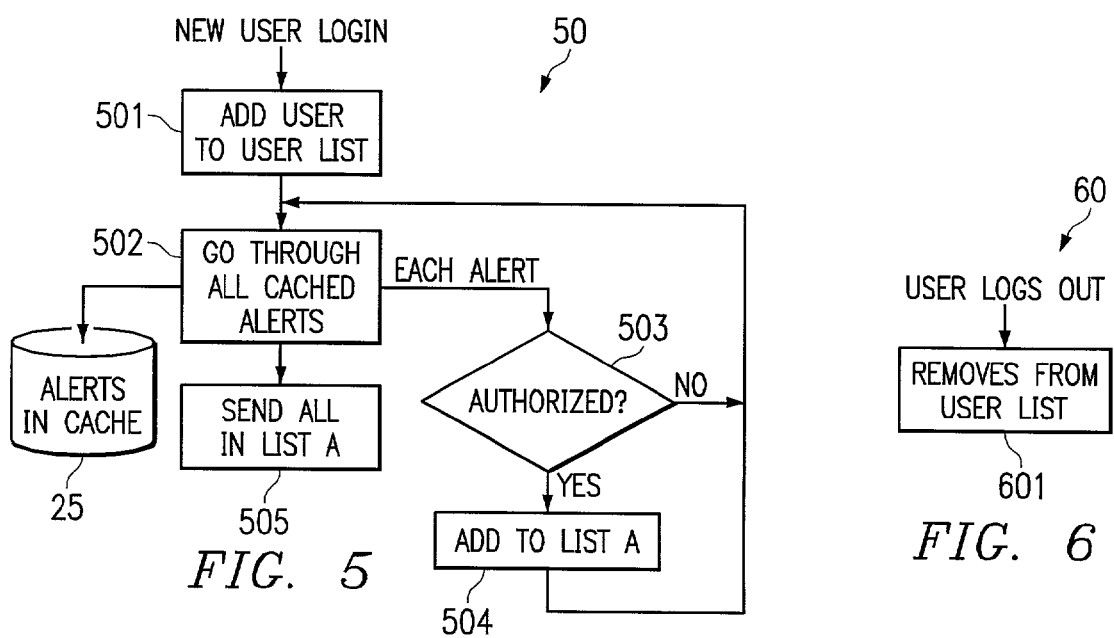
FIG. 5
FIG. 6

METHOD AND SYSTEM FOR IMPROVING COMPUTER NETWORK PERFORMANCE

RELATED APPLICATIONS

This application is related to co-pending application entitled "SYSTEM AND METHOD FOR POLICY-BASED NETWORK MANAGEMENT," assigned Ser. No. 09/469,025, filed Dec. 21, 1999; co-pending application entitled "SYSTEM AND METHOD FOR A COMMON OBJECT CLASS LIBRARY," assigned Ser. No. 09/469,026, filed Dec. 21, 1999; co-pending application entitled "FAULT MANAGEMENT SYSTEM AND METHOD," assigned Ser. No. 09/345,634, filed Jun. 30, 1999; co-pending application entitled "METHOD AND SYSTEM FOR PREDICTIVE ENTERPRISE RESOURCE MANAGEMENT," assigned Ser. No. 09/702,160, filed Oct. 30, 2000, and co-pending application entitled "SYSTEM AND METHOD FOR MANAGING A COMMUNICATION NETWORK UTILIZING STATE-BASED POLLING," assigned Ser. No. 09/770,427, filed Jan. 26, 2001, all of which are assigned to a common assignee, the disclosures of which are hereby incorporated herein by reference.

TECHNICAL FIELD

This invention relates to computer systems and more particularly to a system and method for improving the system performance of such systems by reducing the number of alert messages, and updates thereto, that flow from a central source.

BACKGROUND

Computer networks typically have gateways for receiving events or for polling network elements. These gateways have access to a central management server to relay requests (and messages) to and from the gateway. The gateway becomes aware of such requests through user polling or through other means, such as traps. The central management server may, for example, include a rule engine which would include a user agent process for learning (remembering) the different users and their alerts. An alert could be, for example, notification of a down switch, notification of a down transmission line, or any other type of notification.

Typically, when a system is running and a client (user) logs in and starts a client session, the client would go to the user agent to request a list of all the alerts that are currently in the system pertaining to the user, or pertaining to other selected criteria. The user agent does not have a list of any of the alerts since the agent does not have the context of the user. The agent then goes to the central management server to request a list of all the alerts that have been posted. The requested information then flows from the central server and the user agent then splits out the alerts by authorization, i.e., the alerts that are not authorized for that user must be removed and the proper alerts forwarded to the user.

Thus, one user may be authorized for receiving information for a particular network element. The alerts can be organized in levels and different users can be authorized for different alert levels.

When a second user logs on, that user can also ask for a list of all alerts. The user agent would go back to the rule engine (central server) again and repeat the process. Note that even if the user agent had saved the prior list, it would not know what changes had occurred to the alerts in the interim, so the list would not be a fresh list.

The system works such that when an alert is initially generated from the rule engine, it is received by the user agent which determines which user is authorized for that alert. The agent then sends out the proper alert to the individual user. When an alert is updated or cleared, it is sent out to all users. If the user had received the original alert, the update clears it, or modifies that alert. If the original alert had not been received by this user, then the software at the user's location must know that since it does not have anything to update, it must not have received the original alert and thus the update is not meant for that user. A particular user then may get a lot of notifications that do not apply to that user. This occurs because the user agent can not keep track of original alerts sent and thus must send all updates for all users.

Accordingly, a problem exists in that alert updates (or alert clear signals) are sent to devices or to remote users who never received the original alerts, thereby creating unnecessary traffic on the communication lines.

A further problem is that there is a time delay in accessing the rule engine of the central management server, because each alert is queued to be sent out to the user agent and thus it is difficult to know when a particular alert has gone to a particular user.

A still further problem exists in that the central server, and/or the rule engine, must be accessed each time a user enters the system so that the user can obtain its proper alerts.

SUMMARY OF THE INVENTION

The present invention is directed to a system and method which uses a memory in association with the gateway for storing alerts for other critical messages and for then distributing each stored alert, according to a first of user authorizations, to each user as the need arises. The memory, preferably running as a cache memory, listens for alerts from the central server and creates a message for each user, or host, using in one embodiment, a hash algorithm assigned to a particular user. The hash then serves to prevent a host from receiving the same message more than once when multiple users are served by the same host.

When a new user comes on line, the user agent searches the cache memory for the proper alerts to send to the user, taking into account the hash of the user host as compared to previously sent messages.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 3–6 show flow diagrams of system operation.

DETAILED DESCRIPTION

Figure 1:
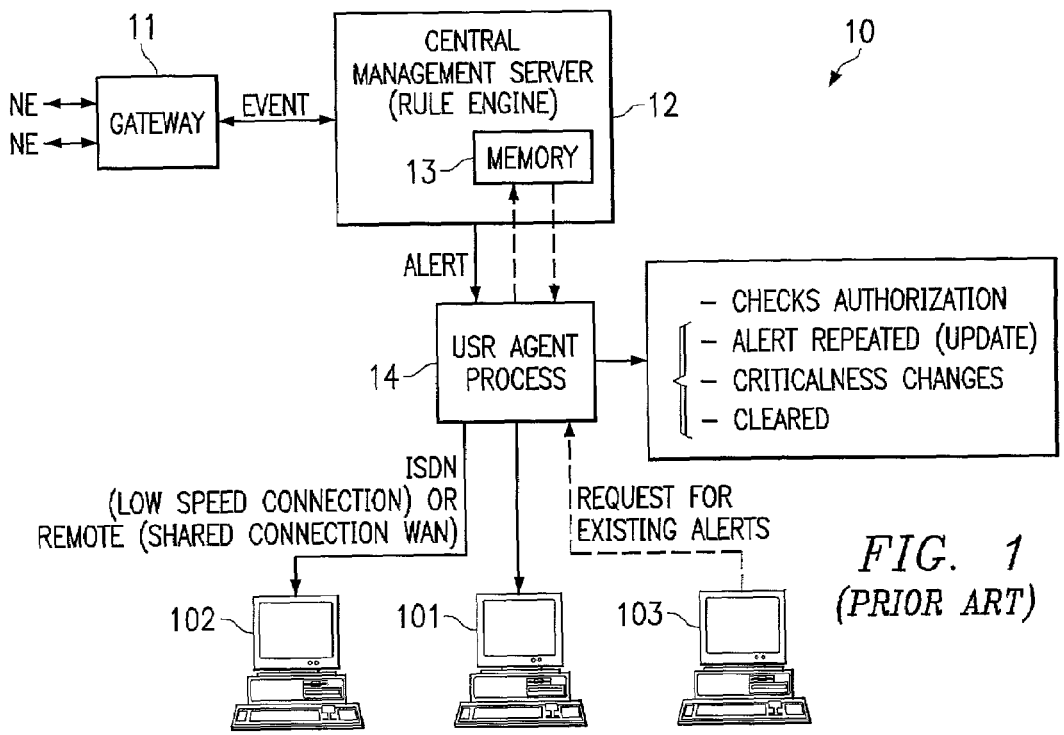
FIG. 1 is a typical prior art system for generating and distributing system messages.

FIG. 1 shows prior art system 10 as discussed above with network elements (NE) communicating with gateway 11, which, in turn, is in communication with server 12, which includes memory 13. Server 12 may be a centralized network management server that manages the NEs. For instance, gateway 11 may receive alerts from the NEs (e.g., by polling the NEs and/or receiving unsolicited messages from the NEs) and may pass such alerts on to server 12. More specifically, in at least one embodiment, rules may be defined by a user specifying particular situations to trigger alerts, and such rules may be provided in the rules engine of central server 12. Gateway 11 may monitor the NEs, and upon determining that one or more of the rules is satisfied, pass the information along to central server 12, which may in turn generate the appropriate alerts. User agent 14 processes each alert for distribution to terminals 101–103, which may be manned by network administrators responsible for overseeing the NEs, for example.

As shown in the example of FIG. 1, a user (e.g., network administrator) may log in to terminal 103, which then requests the existing alerts available for the managed network (e.g., for the NEs). In response, user agent process 14 must request the existing alerts from memory 13 of central management server 12 in order to pass along such existing alerts to user 103. As a result, communication traffic to and from central management server 12 is increased, as well as the required processing on central management server 12. Because central management server 12 may be managing many NEs, it is often desirable to reduce the amount of communication/processing required by such central management server. Furthermore, once the existing alerts are communicated from server 12 to user agent process 14, it determines whether user 103 is authorized to receive any of such alerts before passing them along. Thus, alerts may be communicated from server 12 to user agent process 14, which user 103 is unauthorized to receive. Similarly, upon existing alerts being updated or cleared, such updating/clearing information is communicated from central server 12 to user agent process 14 for each user, even though the corresponding user may not have received (e.g., may not have been authorized to receive) the initial alert being updated/cleared. Therefore, prior art handling of such alerts is typically inefficient and requires unnecessary processing and communication of data from server 12.

Specific examples of network management systems in which various embodiments of the present invention may be implemented are further described in co-pending U.S. patent application Ser. No. 09/469,025 entitled "SYSTEM AND METHOD FOR POLICY-BASED NETWORK MANAGEMENT," Ser. No. 09/469,026 entitled "SYSTEM AND METHOD FOR A COMMON OBJECT CLASS LIBRARY," Ser. No. 09/345,634 entitled "FAULT MANAGEMENT SYSTEM AND METHOD," Ser. No. 09/702,160 entitled "METHOD AND SYSTEM FOR PREDICTIVE ENTERPRISE RESOURCE MANAGEMENT," and Ser. No. 09/770,427 entitled "SYSTEM AND METHOD FOR MANAGING A COMMUNICATION NETWORK UTILIZING STATE-BASED POLLING," the disclosures of which have been incorporated herein by reference.

Figure 2:
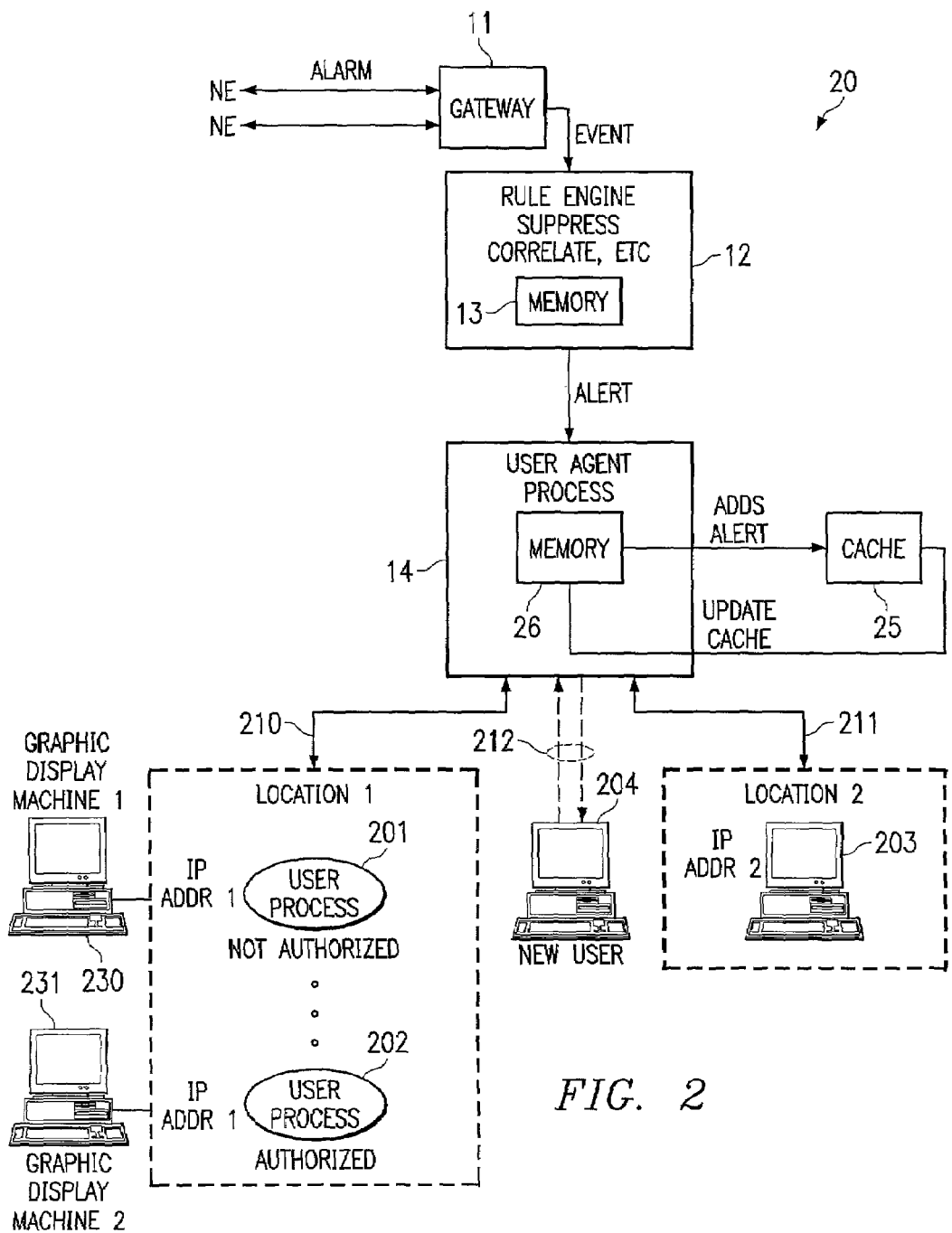
FIG. 2 shows our improvement to the distribution of general system messages, such as alerts.

FIG. 2 shows cache 25 added to user agent 14 (as shown in FIG. 1). Cache 25 is maintained so that it becomes an image of alerts coming from rule engine 12 (executing on the management server). Note that there can be one user agent for all the users in a system, or there can be many such agents, each handling one or more users. The users which are controlled by an agent can be thought of as a group, and the group can be one user.

A hash is generated each time the system goes through the list of users because it is specific for each remote host. A hash is a storage algorithm that indexes each element based on the remainder obtained by dividing the element key by the hash size. This reduces the future look-up time by a factor of the hash size assuming even distribution. When a new user logs in, a message is sent to user agent 14. Agent 14 obtains the current list of alerts from cache 25 associated with user agent 14 rather than going to rule engine 12 as in the prior art. Each user agent 14 steps through its internal list (as contained in memory 26) of all the users that are logged on at that time and if a user meets the authorization criteria, as contained within the user agent, the agent obtains from cache 25 all of the stored alerts matching the authorization.

Cache 25 puts each authorized user's IP address into the hash list stored in the user agent's memory, assuming that the user's IP address is not already stored therein, due to a user (such as user 201) sharing a host (location 1, FIG. 2) with other users (such as with user 202). The system does not send the same update notification to the same host more than once. This is accomplished by checking users as well as IP addresses. The system creates a hash of IP addresses which are generated from a user's IP address when an alert is delivered to that user. The IP address is expressed as a 4 byte integer. That integer value is taken as the hash key. This integer is unique for the remote host. When an update comes along, the system searches through that hash of IP addresses to send out notifications to the proper IP addresses.

Thus, as shown in FIG. 2 with respect to location 1, assume there is an alert that is sent from engine 12 (e.g., an alert that one of the NEs managed by the management server is down). Agent 14, associated with location 1, would look through its list of authorized users and determine that at location 1 there are two user processes 201 and 202 sharing a single machine and which are sharing the same IP address. One user process (202) is authorized to receive the alert and the other user process (201) is not. In this situation, the alert would be sent only to authorized user process 202 as determined from memory 26, in conjunction with cache 25. The hash of user process 202's IP address would be stored.

If both user processes were authorized, in the case of a new alert that is first received, that alert would actually be sent twice to the same IP address, once for each authorized user. That is the only way that the operator knows that it is authorized because it does not know its own authorizations. Whenever an update comes along, the update would be sent only once to that IP address once it is determined that one or more of the users at an IP address are authorized to receive the update. All of the processes at that IP address would receive the update, but since the unauthorized user's process 201 would not have anything to update, process 201 would not display the update. However, process 202 that had the original alert, or the other updates, would receive the update and thereupon update its alert notification. Terminals 230 and 231 are graphics terminals (view back) to allow the user to view alerts. One user could view all of the processes running at one time.

Note that, as shown in FIG. 2, at location 2 since there is only one user process the user may view alerts on the machine directly, or on a "display back" terminal.

Figure 3:
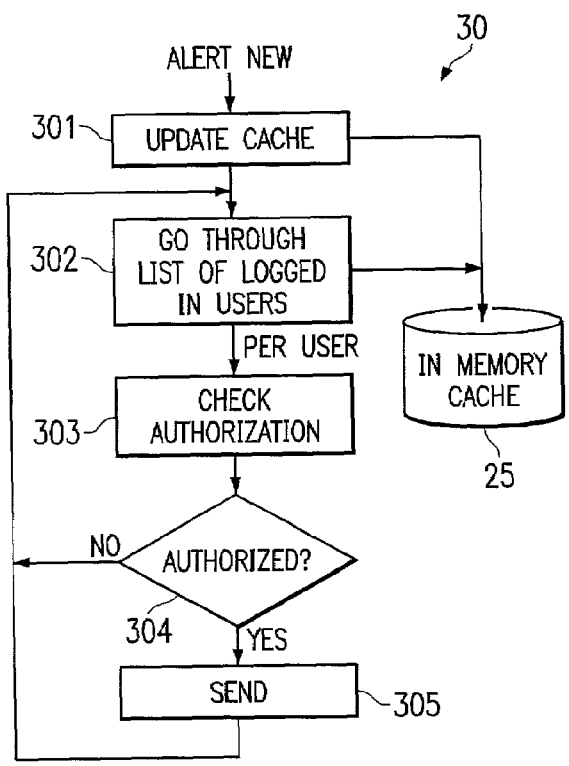

FIG. 3 shows flow diagram 30 for the operation of the user agent process for existing users. As shown, when a new alert comes in, it updates cache 25 (process 301) so that cache 25 reflects a current copy of all of the alerts that are in rule engine 12. User agent 14 (of which there could be many, each serving different user groups) then goes through its list of logged in users, as shown in box 302, to check the authorization (box 303) of each user. If a user is authorized (box 304), it sends the alert (box 305) to the user and then goes back through the loop until it gets through all of its users. By sending this new alert to each user, the agent is, in effect, telling that user that it is authorized for that alert. Thus, in the future if that user gets an update for an alert, it knows that it is authorized to display that update. The IP hash is short-lived only to decide which machines will receive the particular notification.

FIG. 4 shows flow diagram 40 such that when an alert update 41 arrives from the rule engine, cache 25 is updated via process 401. Then the system goes through the list, box 402, of users checking for authorizations, box 403. If a "machine" or "IP" had been sent an alert, there should be a hash in memory, box 405, and box 406 checks to see if that user's IP address is already in the hash table. If it is not, it is added to hash table 406. There is a hash table of IP addresses stored, for example, in memory 26, (FIG. 2) that have one or more operators authorized to receive that alert. There are no duplicate IP addresses in the hash list.

Next, the system goes through the hash list of IP addresses, box 407, and sends the alert (or update) to the machine indicated by the IP hash thus avoiding sending alerts to machines that do not have anyone authorized for that alert and also avoiding sending multiple copies to machines that have multiple users. When a user is found to be authorized to receive an alert, the IP of his machine is put in this temporary hash. If the user shares his/her machine with another authorized user, another entry to the IP hash will not be made. After all users have been checked, a single copy of the alert notification is sent to each IP address (machine). This may be received by one or more users on that machine.

FIG. 5 shows flow diagram 50 for the situation where a new user comes online and the user agent process must handle that new user and bring the user up to date in terms of existing alerts. When the user logs in, he/she is added to a list of users in the system, box 501. Since the user agent now has a list and a copy of all the alerts in its memory, it goes through that list in memory, box 502, and checks the authorization of the new user, box 503, and builds a list of users specific for that user, box 504. Essentially, this is a filtered list containing only those alerts that are for that user. This avoids the need to query the rule engine process that actually created the alerts. The stored alerts are then sent to the new user, box 505.

FIG. 6 shows flow diagram 60 operational when a user logs out. The user agent removes that user, box 601, from the list of logged in users that are in memory. Once a user logs out, that user will no longer be considered in determining whether an authorized user exists at a particular IP location for receiving an update or a new alert. Again, this eliminates unnecessary system traffic since there is no need to send messages or alerts to machines or processes that no longer have interested users.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for sending at least one message to at least one user who may or may not be in communication with the system at any particular time, said system comprising:
   means at a central location for receiving said at least one message for delivery to said at least one user, said at least one user being associated with at least one group of users, according to at least one user-defined rule;
   means associated with said at least one group of users for controlling communication to and from said at least one group of users and said central location;
   means for storing in memory associated with said communication controlling means said at least one message associated with said at least one group of users;
   means for comparing permissions of said at least one user associated with said communication controlling means against permissions for said at least one message when said at least one message is stored, said comparing means generating permission matches; and
   means for delivering stored said at least one message only to said at least one user where said permissions match.

2. The system of claim 1 wherein at least one message is an alert message.

3. The system of claim 1 wherein said means for comparing permissions comprises:
   means for generating at least one hash of at least one Internet Protocol addresses of said at least one group of users;
   and means for comparing a stored at least one hash with said generated at least one hash.

4. The system of claim 1 further comprising:
   means for receiving at least one update to said at least one message; and
   means for delivering said at least one update only to said at least one group of users that is associated with said at least one user who had received said at least one message.

5. The system of claim 1 further comprising:
   means associated with said communication controlling means and responsive to a new said at least one user coming on line for determining which previously stored at least one message matches the permission level of said new at least one user.

6. The system of claim 1 further comprising:
means associated with said communication controlling means and responsive to a new said at least one user for determining which previously stored at least one message matches the permission level of said new at least one user; and
means for delivering to said new at least one user said previously stored at least one message which matches the permission level of said new at least one user.

7. The system of claim 1 further comprising:
means, associated with said communication controlling means and responsive to a new said at least one user coming on line, for delivering to said new at least one user said previously stored said at least one message which matches the permission level of said new at least one user without accessing said central location.

8. The system of claim 1 wherein said central location comprises a rule engine.

9. A method of distributing at least one message to at least one user, the at least one message being sent from a central source to a plurality of users over a network, the at least one message for delivery only to the at least one user in accordance with matches between message permission levels assigned to the at least one message and user permission levels assigned to the plurality of users, said method comprising the steps of:
copying the at least one message into at least one process, the at least one process being associated with at least one user from the plurality of users;
matching, associated with the at least one process, the message permission levels against the user permission levels of each at least one user associated with the at least one process; and
delivering, under selective control of the at least one process associated with the at least one user, each received at least one message to the at least one user only in accordance with the matches between the user permission levels and the message permission levels.

10. The method of claim 9 further comprising the step of:
storing the at least one copied message in a memory associated with the at least one process.

11. The method of claim 9 further comprising the steps of:
copying at least one message update from a central source to the at least one process; and
delivering, under selective control of the at least one process associated with the at least one user, the at least one message update to the at least one user only in accordance with the previous delivery of the at least one message to which the at least one update pertains.

12. The method of claim 9 further comprising the step of:
upon logging on of the at least one user not previous logged onto the network, checking, associated with the at least one process, the user permission level of the newly logged on at least one user against the message permission levels of the copied messages; and
delivering, under selective control of the at least one process, to the newly logged on at least one user the copied at least one message only in accordance with matched ones of the user permission levels and the message permission levels.

13. A system in which at least one alert message sent from a central server to at least one user who may or may not be in communication with the system at any particular time, said system comprising:
means separate from said central server and associated with at least one group including said at least one user for controlling the delivery of said at least one alert message to said associated at least one group;
means for storing in memory local to said controlling means copies of said at least one alert message received from said central server;
means for comparing at least one user permission of said at least one user associated with said controlling means against at least one alert permission associated with said at least one alert message, said comparing means generating at least one permission match; and
means for delivering stored said at least one alert message only to said at least one user having said at least one permission match.

14. The system of claim 13 wherein said comparing means comprises:
means for generating at least one hash of an Internet Protocol address associated with said at least one user;
means for storing said at least one hash; and
means for comparing said stored at least one hash with said generated at least one hash.

15. The system of claim 13 further comprising:
means for distributing an update to said received at least one alert message only to the at least one users to which said received at least one alert message had been delivered.

16. A system for distributing at least one message to at least one user, said at least one message being sent from a central source to at least one user over a computer network, said at least one message for delivery only to certain said at least one user in accordance with at least one match between at least one message permission level assigned to said at least one message and at least one user permission level assigned to said at least one user, said system comprising:
an agent process in association with said at least one user, said agent process capable of copying and storing each sent said at least one message, said agent process capable of comparing said at least one message permission level said at least one user permission level of associated with said at least one user, said at least one user being associated with said agent process, said agent process capable of delivering each received said at least one message to said at least one user only in accordance with said comparing.

17. The system of claim 16 wherein said agent process comprises a cache memory for storing said at least one message.

18. The system of claim 17 wherein said agent process further comprises:
means for copying at least one sent message update; and
means for delivering, in conjunction with said cache memory, each received said at least one sent message update to said at least one user only in accordance with the previous delivery of the at least one message to which said at least one sent message update pertains.

19. The system of claim 18 wherein said agent process further comprises:
means for comparing said user permission level of a newly logged on said at least one user against said at least one message permission level of said copied at least one message; and
means for delivering to said newly logged on said at least one user any said copied at least one message only in accordance with said means for comparing.

* * * * *

UNITED STATES PATENT AND TRADEMARK OFFICE
CERTIFICATE OF CORRECTION

PATENT NO. : 6,963,919 B1
DATED : November 8, 2005
INVENTOR(S) : Gary et al.

It is certified that error appears in the above-identified patent and that said Letters Patent is hereby corrected as shown below:

Title page, Item [54] and Column 1, Lines 1-2,
Title, after "FOR" delete "IMPROVING COMPUTER NETWORK PERFORMANCE" and insert -- MESSAGE AND MESSAGE UPDATE DELIVERY TO A USER --.

Column 6,
Line 45, after "wherein" insert -- said --.
Line 50, delete "addresses" and insert -- address --.

Column 7,
Line 61, after "message" insert -- is --.

Column 8,
Line 23, delete "users" and insert -- user --.
Line 39, insert -- to -- before "said".

Signed and Sealed this

Twenty-eighth Day of February, 2006

JON W. DUDAS
*Director of the United States Patent and Trademark Office*